(12) United States Patent
Rariden et al.

(10) Patent No.: US 6,292,472 B1
(45) Date of Patent: Sep. 18, 2001

(54) REDUCED POLLING IN AN SNMPV1-MANAGED NETWORK

(75) Inventors: Joel Rariden, Ashburn; Sheila R. Kinderman, Herndon; Charles A. Schlicht, Woodbridge, all of VA (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/177,197

(22) Filed: Oct. 22, 1998

(51) Int. Cl.[7] ............................ G06F 11/30; G06F 15/16; H04L 12/66
(52) U.S. Cl. .................. 370/254; 370/401; 370/408; 370/449; 709/202; 709/223; 379/34
(58) Field of Search .................... 370/254, 216, 370/400, 401, 408, 449, 465, 466, 467; 379/34, 88.17, 88.22, 265, 309; 709/201, 202, 203, 220, 221, 223, 224, 230, 249, 250; 714/1, 2, 3, 4

(56) References Cited

U.S. PATENT DOCUMENTS

| 5,559,958 | 9/1996 | Farrand et al. | 395/183.03 |
| 5,651,006 | 7/1997 | Fujino et al. | 370/408 |
| 5,706,508 | 1/1998 | Chen et al. | 395/616 |
| 5,828,830 | * 10/1998 | Rangaraian et al. | 395/185.01 |
| 5,907,696 | * 5/1999 | Stilwell et al. | 395/500 |
| 5,961,594 | * 10/1999 | Bouvier et al. | 709/223 |
| 5,978,845 | * 11/1999 | Reisacher | 709/223 |
| 6,181,776 | * 1/2001 | Crossley et al. | 379/34 |

* cited by examiner

Primary Examiner—Alpus H. Hsu
(74) Attorney, Agent, or Firm—Ware, Fressola, Van Der Sluys & Adolphson LLP

(57) ABSTRACT

The present invention provides a network configuration having a network management system coupled to a wide area network having high speed switches. Each high speed switch has a respective SNMP/file transfer protocol agent sub-system that emits a trap message containing event change information such as equipment error or interface association error. The network management system has a fault status agent that receives the trap message, then if the trap number is not in sequence, then the fault status agent initiates a lost trap default procedure and immediately polls the high speed switch for current status information. If a predetermined time elapses with no trap message from the high speed switch, then the fault status agent polls the high speed switch for a current trap number.

10 Claims, 3 Drawing Sheets

US 6,292,472 B1

REDUCED POLLING IN AN SNMPV1-MANAGED NETWORK

BACKGROUND OF THE INVENTION

1. Technical Field

This invention relates to a network; and more particularly relates to a network having a network management system coupled to a wide area network having high speed switches.

2. Description of Prior Art

In a known wide area network (WAN) having a network management System (NMS) and various nodes (switches) communicating via an asynchronous transfer mode (ATM) and/or frame relay, each node sends status information to the network management system in traps containing status information. In an implementation of a network management system according to the Simple Network Management Protocol (SNMP) v1, the protocol for communicating traps to the network management system does not call for confirming that a trap reaches the network management system, so there is the possibility that relying on only receiving traps from each node could result in the network management system not being made aware in a timely manner of a change in status of a node. Therefore, each node is regularly polled for such status information. This polling is an inefficient use of network bandwidth.

One disadvantage of the Simple Network Management Protocol (SNMP) v1 is that the amount of network management polling required to circumvent potential trap loss leads to excessive management traffic.

SUMMARY OF THE INVENTION

The present invention provides a network configuration having a network management system coupled to a wide area network having high speed switches (nodes).

Each high speed switch has a respective SNMP/file transfer protocol agent sub-system that emits a trap message containing event change information such as equipment error or interface association error and a sequential trap number.

The network management system has a fault status agent that receives the trap message; and if the trap number is not next in sequence, then the fault status agent initiates a lost trap default procedure and immediately polls the high speed switch for current status information.

Moreover, if a predetermined time elapses with no trap message from the high speed switch, then the fault status agent polls the high speed switch for the current trap number.

The basic idea of the present invention is to reduce the need for periodic polling of a node's status information using a node's trap number to determine whether any of the node's trap information has been lost.

One advantage of the present invention is that based on an average of 200 periodic polls per node, expect a 99.5% decrease in periodic polling requests, partially offset by conditional polling on trap loss detection, which is not easily quantified. The present invention requires discovery of SNMP party indexes, which provides an increase of about 1% of initial poll requests.

A DESCRIPTION OF THE DRAWING

For a fuller understanding of the nature of the invention, reference should be made to the following detailed descriptions taken in connection with the accompanying drawings, not in scale, in which.

BEST MODE FOR CARRYING OUT THE INVENTION

Figure 1:
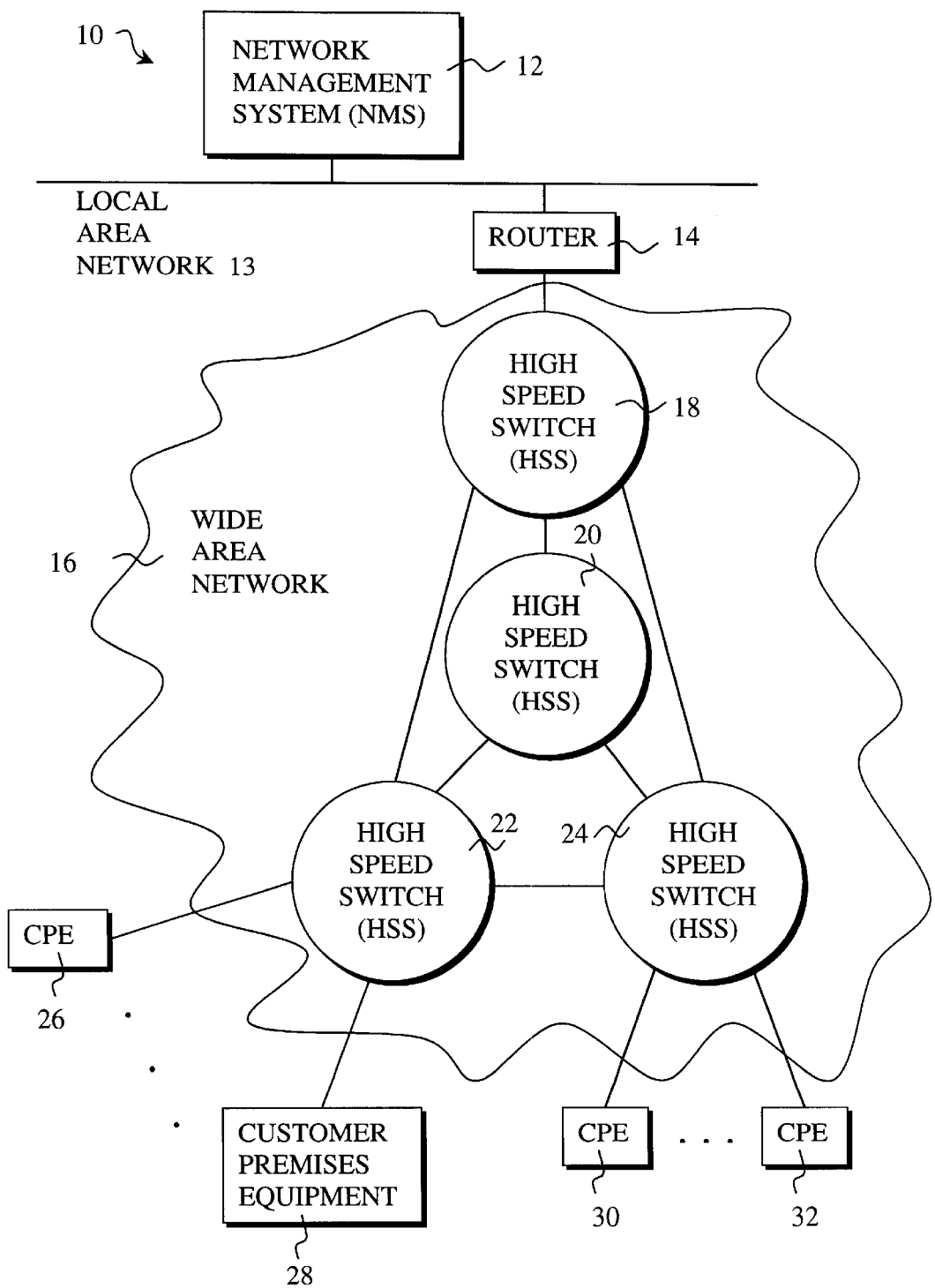
FIG. 1 is a block diagram of a network configuration that is the subject matter of the present invention.

FIG. 1—The Network Configuration 10

FIG. 1 shows a network configuration generally indicated as 10 having a network management system 12 and a router 14 connected to a local area network generally indicated as 13 and a wide area network generally indicated as 16. The wide area network 16 has high speed switches (HSS node) 18, 20, 22, 24 connected to customer premises equipment (CPE) 26, 28, 30, 32.

Figure 2:
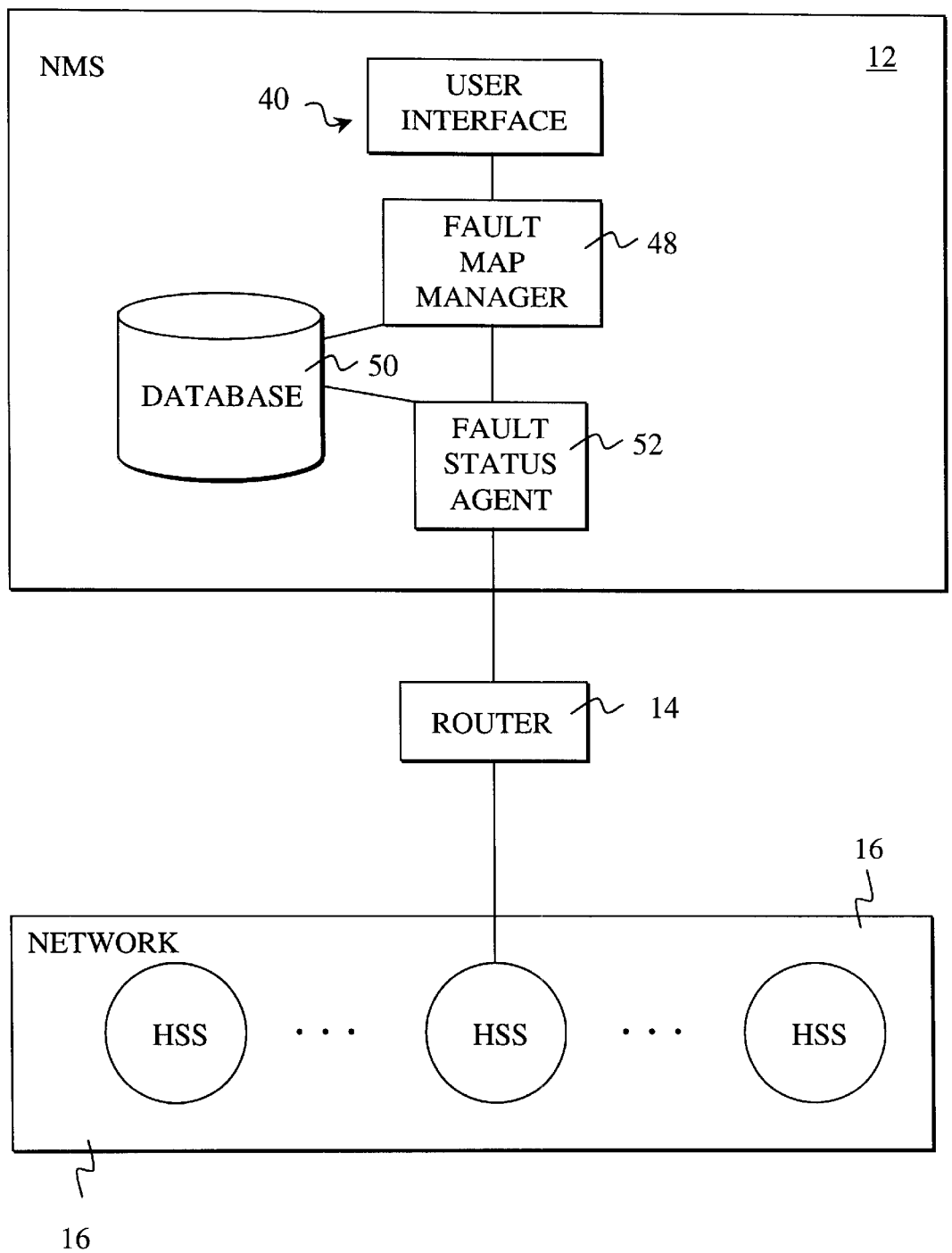
FIG. 2 is a block diagram showing in more detail a network management system shown in FIG. 1.

FIG. 2—The Network Management System 12

FIG. 2 shows the network management system 12 having a user interface 40, a fault map manager 48, a database 50 and a fault status agent 52, discussed below.

Figure 3:
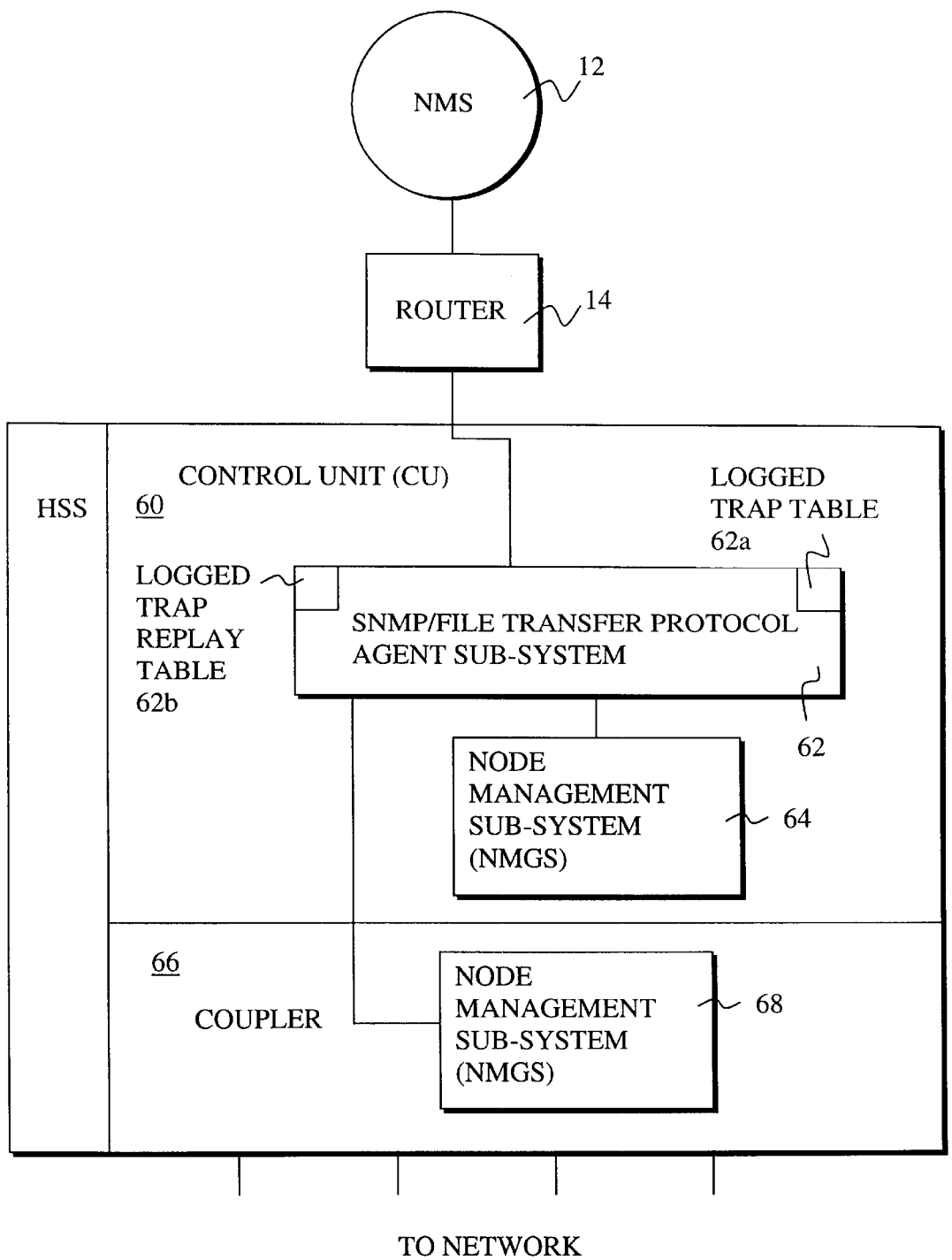
FIG. 3 is a block diagram showing in more detail a high speed switch shown in FIG. 1.

FIG. 3—The High Speed Switches 18, 20, 22, 24

FIG. 3 shows a typical high speed switch 18, 20, 22, 24 having a control unit 60 with an SNMP/File transfer protocol agent sub-system 62 and a node management sub-system 64 and having a coupler 66 with a node management sub-system 68.

The Basic Operation

In operation, the fault status agent 52 (FIG. 2) of the network management system 12 and each SNMP/File transfer protocol agent sub-system 62 (FIG. 3) of a respective high speed switch 18, 20, 22, 24 communicate with one another in order to exchange initialization information, event change information, and time-out information all related to equipment error or interface association error (i.e. a communication protocol problem) of the respective high speed switch (HSS nodes) 18, 20, 22, 24. In summary, all status changes for managed SNMP high speed switch nodes are reported via traps. The SNMP/File transfer protocol agent subsystem 62 (FIG. 3) increments a value of an snmpTrapNumbers each time a trap is sent to the network management system 12, and the snmpTrapNumbers object is appended to each SNMPv1 trap. The fault status agent 52 maintains a local copy of the value for each SNMP node. On receipt of a new trap from the SNMP/File transfer protocol agent sub-system 62 (FIG. 3), the trap number of the new trap will be compared to that of the previously received trap. If the value is more than one greater than the local value, the network management system (NMS) 12 will poll the node for current status information.

The initialization, event change, and time-out procedures will be discussed in more detail as follows:

Initially, the fault status agent 52 (FIG. 2) of the network management system 12 initially polls the high speed switches (HSS nodes) 18, 20, 22, 24 for a current trap number and a current node's objects status. In response thereto, each SNMP/File transfer protocol agent sub-system 62 (FIG. 3) of a respective high speed switch 18, 20, 22, 24 emits a sequence of response messages having the current trap number and the current node's objects status, which contains initialization information about any current equipment error or any interface association error related to the respective high speed switch (HSS nodes) 18, 20, 22, 24. The fault status agent 52 (FIG. 2) stores a respective current node's objects status for each respective high speed switch (HSS nodes) 18, 20, 22, 24. This initializes the communication protocol between the fault status agent 52 (FIG. 2) and each SNMP/File transfer protocol agent sub-system 62 (FIG. 3) of the respective high speed switch 18, 20, 22, 24.

From time-to-time thereafter, events will change with respect to equipment error or interface association error (i.e. a communication protocol problem) of the respective high speed switch (HSS nodes) 18, 20, 22, 24. When events change in the respective high speed switch 18, 20, 22, 24, each SNMP/File transfer protocol agent sub-system 62 (FIG. 3) will emit a respective event change trap message having an updated respective current trap number and an updated respective node's objects status, which contains information about the change in events of the equipment error or interface association error related to the respective high speed switch (HSS nodes) 18, 20, 22, 24. Each SNMP/File transfer protocol agent sub-system 62 (FIG. 3) will increment its respective current node trap number by one each time a respective event change trap message is sent.

The fault status agent 52 of the network management system 12 receives the respective event change trap message and compares the updated respective current trap number to an internally stored value representing the last trap number received (either via trap or polling). If the respective event change trap message is in sequence, then the fault status agent 52 (FIG. 2) stores the updated respective current trap number and the updated respective node's objects status for the respective high speed switch 18, 20, 22, 24. If the respective event change trap message is not in sequence, then the fault status agent 52 initiates a lost trap default software procedure, and immediately polls the respective high speed switch 18, 20, 22, 24 for the current node's objects status.

Periodically (time-out), the fault status agent 52 (FIG. 2) will not hear from a particular SNMP/File transfer protocol agent sub-system 62 (FIG. 3) and a time-out procedure will be initiated. For example, if a predetermined time elapses with no trap message from a respective high speed switch 18, 20, 22, 24, then the fault status agent 52 (FIG. 2) polls the high speed switch 18, 20, 22, 24 for a current trap number; and if the current trap number received from the SNMP/File transfer protocol agent sub-system 62 is not the same as the last one received by the network management system 12, then a lost trap message default procedure is initiated, and the fault status agent 52 (FIG. 2) polls the respective high speed switch 18, 20, 22, 24 for the respective current node's objects status. The scope of the invention is not intended to be limited to any particular predetermined time.

The fault status agent 52 (FIG. 2) and the SNMP/File transfer protocol agent sub-system 62 (FIG. 3) are respectively implemented in software using traps in a typical microprocessor-based architecture. The typical microprocessor-based architecture includes a microprocessor, a Random Access Memory (RAM), a Read Only Memory (ROM), Input/Output devices, and a bus for providing data and control signals therebetween. The scope of the invention is not intended to be limited to any particular software embodiment, or only a software embodiment because embodiments are envisioned using hardware, or a combination of software and hardware thereof.

SNMP/File TransferProtocol Agent Subsystem 62 Maintains a Logged Trap Table 62a

The SNMP/File TransferProtocol Agent Subsystem 62 maintains in a logged trap table 62a and logs the last several traps sent to a destination party (e. g., a network management system). The Fault Status Agent 52 will use the trap sequence number information to detect lost traps (from a discontinuity in the received sequence numbers, e.g., a trap number 17 followed by a trap number 20), and will then send an SNMP set command to the SNMP/File TransferProtocol Agent Subsystem 62 to request replay of any lost traps (e.g., trap numbers 18 and 19).

The logged trap table 62a is a circular list. When a maximum capacity is reached (the maximum number of traps are already logged), then the SNMP/File TransferProtocol Agent Subsystem 62 writes the next trap sent out over the oldest trap in the logged trap table 62a.

If the SNMP/File TransferProtocol Agent Subsystem 62 receives a request to replay more traps than are stored in the logged trap table 62a, then the SNMP/File TransferProtocol Agent Subsystem 62 will refuse the request and send an SNMP error code message (genErr (5)). The SNMP error code message (genErr (5)) is sent, rather than bad or incorrect trap information, because the contents of the logged trap table 62a may have changed since the fault status agent 52 issued the request, due to the automatic rollover of the contents when new traps are generated from the high speed switches 18, 20, 22, 24. Each high speed switch 18, 20, 22 or 24 has a respective logged trap table 62a.

The logged trap table 62a is cleared upon restarting a high speed switch 18, 20, 22 or 24.

A Logged Trap Replay Table 62b

The SNMP/File TransferProtocol Agent Subsystem 62 also maintains a logged trap replay table 62 b to manage retransmission of any traps which are stored in the logged trap table 62a.

In operation, the Fault Status Agent 52 sends the SNMP Set command to request a replay of traps, which must contain each of the following objects (parameters) in this order:

adnSaLoggedTrapReplayFirst,
adnSaLoggedTrapReplayLast, and
adnSaLoggedTrapReplayOn.

If one of the objects is missing, or the order is incorrect, then the SNMP/File TransferProtocol Agent Subsystem 62 will return an error response with the SNMP error code message.

In effect, the SNMP Set command specifies a starting sequence trap number and an ending sequence trap number (e.g., trap number 18 and 19). Both sequence trap numbers must be present in the logged trap table 62a for the SNMP set command to be successful.

If both starting and ending sequence trap numbers are found in the logged trap table 62a, then the SNMP/File TransferProtocol Agent Subsystem 62 will then replay the traps, starting with the first one specified, and ending with the last one specified. If the value of the parameter, adnSaLoggedTrapReplayFirst, is equal to the parameter, adnSaLoggedTrapReplayLast, then only one trap is replayed.

The ending sequence trap number may have a higher value than the starting sequence trap number, in the case that the trap sequence number has reached its maximum and rolled over through zero.

The SNMP/File TransferProtocol Agent Subsystem 62 will look in the adnSaLoggedTrapTable using the value given in the SNMP Set Command for the parameter, adnSaLoggedTrapReplayPartyIndex, as the parameter, adnSaLoggedTrapPartyIndex, and using the value of the parameter, adnSaLoggedTrapReplayFirst, as the value for the parameter, adnSaLoggedTrapIndex. If the first trap is found in the parameter, adnSaLoggedTrapTable, then the SNMP/File TransferProtocol Agent Subsystem 62 will look for the last trap to be replayed, using the value of the parameter, adnSaLoggedTrapReplayLast as the value for the parameter, adnSaLoggedTrapIndex. If either the first trap to be replayed or the last trap to be replayed cannot be found in the adnSaLoggedTrapTable, then an error response is returned with the SNMP error code message.

The value of the parameter, adnSaLoggedTrapReplayon, is set to "enabled" by the fault status agent 52 in the SNMP Set command, and is reset to "disabled" by the SNMP/File TransferProtocol Agent Subsystem 62 when the command has been processed.

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the invention is intended to be claimed in a regular utility application to cover all of the generic and specific features of the invention herein described and all statements of the scope of the invention which, as a matter of language, might be said to fall therebetween.

What is claimed is:

1. A network configuration (10) having a network management system (12) coupled to a wide area network (16) having high speed switches (18, 20, 22, 24), wherein each high speed switch (18, 20, 22, 24) has a respective SNMP/file transfer protocol agent sub-system (62) that emits a trap containing event change information and a sequential trap number; and wherein the network management system (12) has a fault status agent (52) that receives the trap, and if the sequential trap number is not in sequence, then the fault status agent (52) initiates a lost trap default procedure and immediately polls a respective high speed switch (18, 20, 22, 24) for current status information.

2. A network configuration (10) according to claim 1, wherein, if a predetermined time elapses with no trap message from the high speed switch (18, 20, 22, 24), then the fault status agent (52) polls the respective high speed switch (18, 20, 22, 24) for a current trap number.

3. A network configuration (10) according to claim 2, wherein if the trap message from the SNMP/File transfer protocol agent sub-system is not in sequence, then the fault status agent (52) initiates a lost trap message default procedure and polls the respective high speed switch (18, 20, 22, 24) for the current status information.

4. A network configuration (10) according to claim 1, wherein the event change information includes equipment error or interface association error.

5. A network configuration (10) according to claim 1, wherein the trap message includes a current trap number.

6. A network configuration (10) according to claim 1, wherein each SNMP/File TransferProtocol Agent Subsystem (62) maintains in a respective logged trap table (62*a*) and logs the last several traps sent to a destination party.

7. A network configuration (10) according to claim 6, wherein the respective logged trap table (62*a*) is a circular list; and wherein when a maximum capacity is reached, then the respective SNMP/File TransferProtocol Agent Subsystem (62) writes a next trap over an oldest trap in the logged trap table (62*a*).

8. A network configuration (10) according to claim 6, wherein each respective SNMP/file transfer protocol agent sub-system (62) maintains a respective logged trap replay table (62*b*) to manage retransmission from the SNMP/File TransferProtocol Agent Subsystem (62) of any traps which are stored in the logged trap table (62*a*).

9. A network configuration (10) according to claim 8, wherein the fault status agent (52) sends a SNMP Set command specifying a starting sequence trap number and an ending sequence trap number.

10. A network configuration (10) according to claim 9, wherein both sequence trap numbers must be present in the logged trap table (62*a*) for the SNMP set command to be successful.

* * * * *

UNITED STATES PATENT AND TRADEMARK OFFICE
CERTIFICATE OF CORRECTION

PATENT NO.    : 6,292,472 B1
DATED         : September 18, 2001
INVENTOR(S)   : Rariden et al.

It is certified that error appears in the above-identified patent and that said Letters Patent is hereby corrected as shown below:

Title page,
Item [54] delete "SNMPV1-MANAGED" and insert -- SNMPv1-MANAGED --.

Column 1,
Lines 1-2, delete "SNMPV1-MANAGED" and insert -- SNMPv1-MANAGED --.

Column 2,
Line 48, delete "SNMPv1 trap" and insert -- SNMPv1 trap --.

Signed and Sealed this

Twelfth Day of March, 2002

*Attest:*

*Attesting Officer*

JAMES E. ROGAN
*Director of the United States Patent and Trademark Office*